(12) United States Patent
Barnett

(10) Patent No.: US 10,343,474 B2
(45) Date of Patent: Jul. 9, 2019

(54) SUSPENSION BEARING LUBRICATING SYSTEM

(71) Applicant: Wyatt Barnett, Aledo, IL (US)

(72) Inventor: Wyatt Barnett, Aledo, IL (US)

( * ) Notice: Subject to any disclaimer, the term of this patent is extended or adjusted under 35 U.S.C. 154(b) by 0 days.

(21) Appl. No.: 15/857,353

(22) Filed: Dec. 28, 2017

(65) Prior Publication Data

US 2018/0119728 A1 May 3, 2018

Related U.S. Application Data

(63) Continuation of application No. 14/971,973, filed on Dec. 16, 2015, now abandoned.

(51) Int. Cl.
| | |
|---|---|
| *F16C 33/10* | (2006.01) |
| *B60G 7/00* | (2006.01) |
| *B60G 11/12* | (2006.01) |
| *F16C 33/66* | (2006.01) |
| *F16C 11/04* | (2006.01) |

(52) U.S. Cl.
CPC ............. *B60G 7/001* (2013.01); *B60G 11/12* (2013.01); *F16C 33/102* (2013.01); *F16C 33/6677* (2013.01); *B60G 2204/418* (2013.01); *F16C 11/045* (2013.01); *F16C 2326/05* (2013.01)

(58) Field of Classification Search
CPC ........... F16C 33/102; Y10T 403/32561; Y10T 403/35868; Y10T 403/32877; Y10T 403/32885; Y10T 403/32893; Y10T 403/32918; Y10T 403/32926; Y10T 403/32934; Y10T 403/32951; Y10T 403/32909; Y10T 403/255; Y10T 403/257; Y10T 403/259; B60G 7/001
See application file for complete search history.

(56) References Cited

U.S. PATENT DOCUMENTS

| | | | |
|---|---|---|---|
| 2,333,183 | A | 11/1943 | Jones |
| 2,847,238 | A | 8/1958 | Bolling |
| 4,576,488 | A | 3/1986 | Steiner et al. |
| 4,607,977 | A | 8/1986 | Vamelis et al. |
| 4,988,218 | A | 1/1991 | Quaglia |
| 5,211,484 | A | 5/1993 | Quaglia |
| 6,450,073 | B1 | 9/2002 | Boyer et al. |
| 6,698,932 | B2 | 3/2004 | Hamaguchi et al. |
| 7,651,274 | B2 | 1/2010 | Yamamoto et al. |
| 8,459,894 | B2 | 6/2013 | Svensson |
| 9,441,669 | B2 | 9/2016 | Villemagne et al. |
| 2010/0158601 | A1 | 6/2010 | Madrid et al. |
| 2013/0206513 | A1 | 8/2013 | Webb et al. |

*Primary Examiner* — Joshua T Kennedy
(74) *Attorney, Agent, or Firm* — Hamilton IP Law, PC; Jay R. Hamilton; Charles A Damschen

(57) ABSTRACT

A Suspension Bearing Lubricating System, lubricating moving parts engaging with pivoting suspension component bearings used in street motorcycles, dirt bikes, all-terrain vehicles and various other machines. The Suspension Bearing Lubricating System comprises of a bolt hollowed internally and capped with a grease fitting (or form of lubrication receptacle) or a bolt which is hollow at both ends but solid in the center and a specialized bushing allowing for the flow of grease. Lubricant will be inserted via a lubricant receptacle; lubricant will travel into the bolt then out of holes in the shaft of the bolt which will allow passage of lubricant into bushing if applicable. Once lubricant reaches specialized bushing it will travel into integrated grooves to holes in the bushing then out, directly in contact with the suspension component bearings.

11 Claims, 5 Drawing Sheets

SUSPENSION BEARING LUBRICATING SYSTEM

CROSS REFERENCE TO RELATED APPLICATIONS

The present application is a continuation of U.S. patent application Ser. No. 14/971,973 filed Dec. 16, 2015, all of which are incorporated by reference herein in their entireties.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable.

AUTHORIZATION PURSUANT TO 37 C.F.R. § 1.71 (D)

A portion of the disclosure of this patent document contains material which is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

Field of the Invention

A suspension assembly composed of a (but not limited to) swing arm, shock and linkage assembly is commonly utilized in street motorcycles, dirt bikes, all-terrain vehicles and various other machines. The movement and proper function of the suspension assembly is crucial to the overall performance of said machine. These parts experience a lot of wear due to friction, water, dirt, sand and other contaminates getting inside the suspension component's bearings and/or bushings and shortening the life of the bearings. Proper and thorough lubrication of the swing arm and suspension linkage bearings can help slow and reduce such wear. Over a period of time without lubrication the suspension bearings will become filled with contaminants, oxidize, and seize causing the machine's handling capabilities and performance to decrease. The decrease in suspension handling capabilities and performance can lead to (but is not limited to) malfunction, crashes, property damage, injury and death.

However, the assemblies must be easily accessible for lubrication and the lubrication must cover a substantial portion of the surface area of the swing arm and linkage bearings to properly lubricate them. Regular suspension bolts are not able to provide grease to the bushings to lubricate the suspension component bearings. The said bearings are difficult to lubricate, due to the fact the user must partially disassemble the machine. The process of removing suspension components to properly and periodically grease the suspension bearings is a time consuming and vigorous process, generally causing the user to neglect the bearings of proper maintenance and lubrication.

Presently, there is no publicly available form of a Suspension Bearing Lubricating System intended for street motorcycles, dirt bikes, all-terrain vehicles and various other machines capable of lubricating a machine's suspension bearings without some disassembly of the machine's suspension components.

SUMMARY OF DISCLOSURE

The Suspension Bearing Lubricating System has many aspects to make it work properly for the application it is intended. Previously, to lubricate the suspension bearings of street motorcycles, dirt bikes, all-terrain vehicles and various other machines one had to partially disassemble the machine. Lubricant applied via a grease gun or some form of lubricating tool, will be able to travel from grease zerks or lubricant receptacle fitted at one or both ends of the bolt (depending on the machine's specific application requirements) into the bolt's hollowed, internal passageway. Once the lubricant fills the passageway, the excess lubricant will flow into a specialized bushing surrounding the bolt shaft (when applicable). The bushing will be suited with a groove inside the bushing which will allow lubricant to travel throughout the entire bushing and eventually reaching the passage holes in the bushing. The lubricant will then travel from the through holes directly into the suspension bearings, internally lubricating them and pushing water, dirt, sand and other contaminates out of the bearing essentially preventing the contaminates from wearing the bearings and or causing them to rust.

When the user uses the Suspension Bearing Lubricating System he/she will only be required to connect a grease gun or lubricant provider to the grease zerk or lubricant receptacle and insert grease or lubricant. Once the lubricant enters via the grease zerk or lubricant receptacle and travels to the bearings, there is no more work needed to be completed by the user. This simplistic maintenance allows the user to quickly and efficiently lubricant the suspension bearings preventing premature wear.

DETAILED DESCRIPTION OF THE INVENTION

Figure 1:
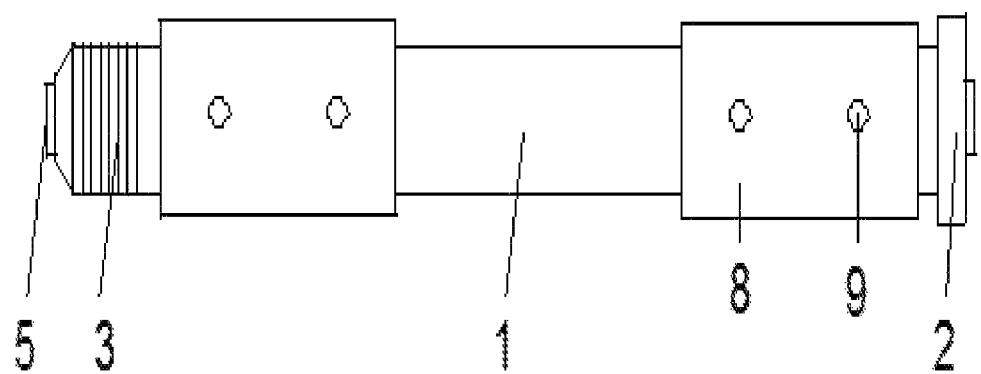
FIG. 1 is a side view of a portion of the Suspension Bearing Lubricating System with specialized, functional bushings.
Figure 2:
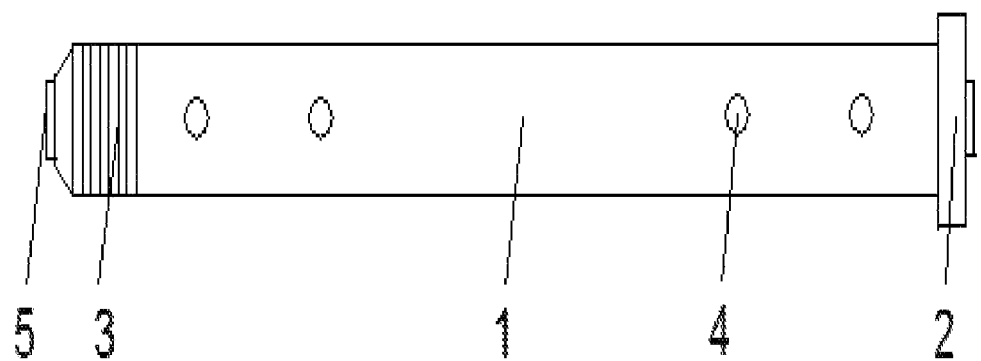
FIG. 2 is a side view of a portion of the Suspension Bearing Lubricating without bushings shown in FIG. 1.
Figure 3:
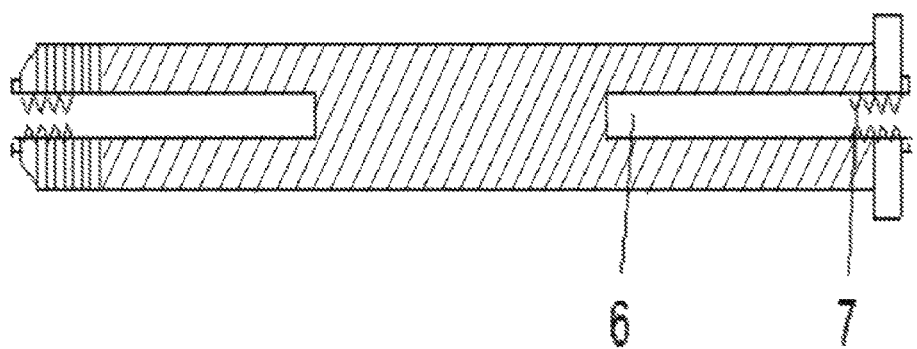
FIG. 3 is a cut-away, side view of Suspension Bearing Lubricating System without bushings shown in FIG. 1.
Figure 4:
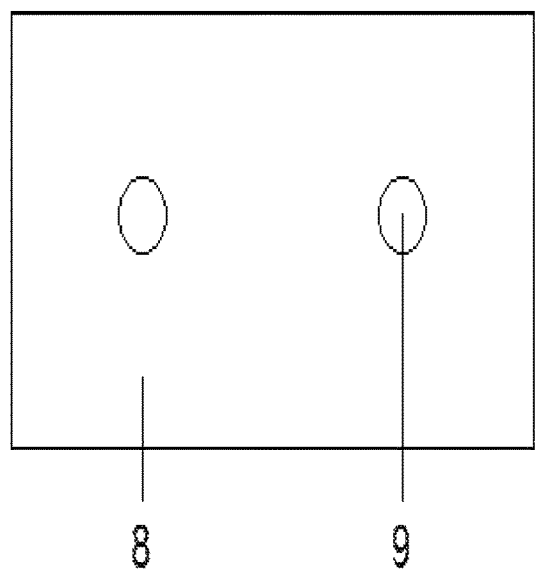
FIG. 4 is an enlarged cross sectional view of the specialized bushing a shown in FIG. 1.
Figure 5:
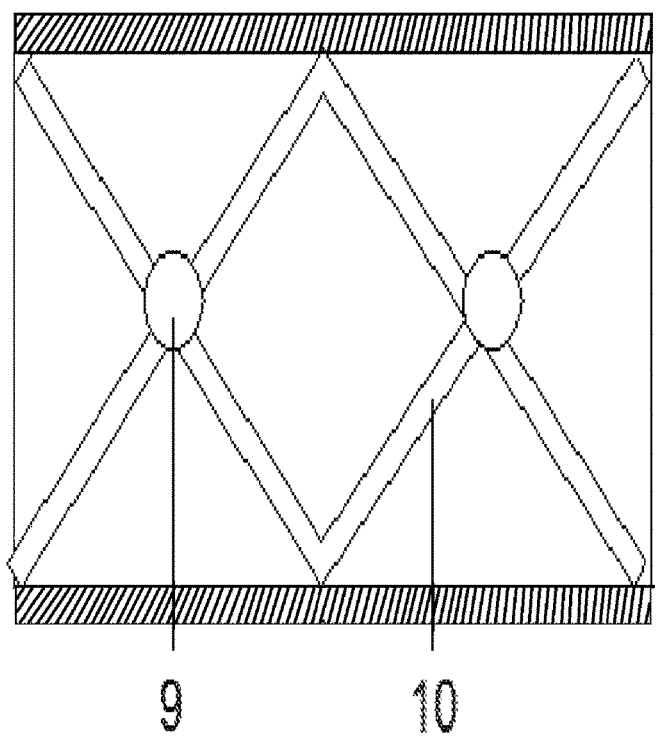
FIG. 5 is an enlarged, cut-away, cross sectional view of the specialized bushing a shown in FIG. 4.

Shown in FIG. 1 is the complete Suspension Bearing Lubricating System. FIG. 2 shows lubricant receptacles 5 secured to the threads 7 of FIG. 3. Lubricant will enter the lubricant receptacles 5 until it fills the passageway(s) 6 shown in FIG. 3 in the shaft 1 of the bolt. Once the lubricant fills and forces itself out of the passageway(s) 6, it flows from the holes 4 shown in FIG. 2. The lubricant will flow from the holes 4 into the specialized bushing's grooves 10 shown in FIG. 5. The lubricant will travel along the lubricant guide grooves 10 to the exit holes 9 of the specialized bushing(s) shown in FIG. 5. Once the lubricant reaches the exit holes 9, it will flow directly into the suspension component's bearings. Thus, lubricating them and preventing them from premature wear and failure.

The round bar stock is cut to desired length then placed in a CNC machine and turned down until given the appropriate circumference of the bolt head 2 then again to reach the circumference of the bolt shaft 1. The threads of the bolt 3 will then be machined into the end of the shaft 1. The bolt will then have passageway(s) 6 drilled into the center of the ends of the bolt. Next the holes 4 appearing in FIG. 2 are drilled into the shaft 1. Once the holes 4 are in place, the lubricant receptacle threads 7 will be tapped in each lubricant passageway 6. The specialized bushing 8 will be made from pipe pre-cut to desired diameter then cut to desired length. The lubricant guide grooves 10 are machined into the inside of the specialized bushing 8 with a CNC machine. Lastly the specialized bushing's lubricant exit holes 9 will be drilled out completely. This completes the manufacturing process of the Suspension Bearing Lubricating System.

In the above-presented embodiment examples, the lubrication system was installed in a dirt bike equipped with a pivoting swing arm and linkage suspension assembly, where it secures the swing arm, shock, and a linkage assembly. The lubrication system is also suitable for other machines equipped with a pivoting swing arm and linkage assembly, or also such other working machines that have a suspension assembly requiring continuous or intermittent lubrication during the operation of said working machine. Consequently, the present disclosure is not limited to the embodiment examples presented above, but it may vary within the scope of the appended claims. Those of ordinarily skill in the art will at once recognize various changes and modifications from those which have been disclosed, but all such changes and modifications will not depart from the essence of the invention as disclosed herein, and all such changes and modifications are intended to be covered by the appended claims.

What is claimed is:
1. A suspension bearing lubrication system comprising:
 a. a bolt having a first end formed as a bolt head having a first axial face and a second end formed as threads having second axial face, said bolt comprising:
  i. a shaft positioned between said first and second ends;
  ii. a first longitudinal passageway extending longitudinally into said first axial face along a first portion of a length of said bolt;
  iii. a second longitudinal passageway extending longitudinally into said second axial face along a second portion of said length of said bolt, wherein said first and second longitudinal passageways are not fluidly connected with one another and are separated by a portion of said shaft;
  iv. a first set of receptacle threads formed at a distal end of said first longitudinal passageway;
  v. a second set of receptacle threads formed at a distal end of said second longitudinal passageway;
  vi. a first hole extending from an exterior of said bolt to said first longitudinal passageway, wherein said first hole is oriented in a radial dimension with respect to said bolt;
  vii. a second hole extending from an exterior of said bolt to said second longitudinal passageway, wherein said second hole is oriented in said radial dimension with respect to said bolt, and wherein said shaft axially spaces said first hole from said second hole;
 b. a first lubricant receptacle engaged with said first set of receptacle threads and in fluid communication with said first longitudinal passageway;
 c. a second lubricant receptacle engaged with said second set of receptacle threads and in fluid communication with said second longitudinal passageway;
 d. a first bushing positioned over a portion of said exterior of said bolt adjacent said first end of said bolt, said first bushing comprising:
  i. an exterior surface;
  ii. an interior surface formed with a plurality of lubricant guide grooves, wherein at least two of said plurality of lubricant guide grooves intersect at an exit hole, wherein said exit hole extends from said exterior surface to said interior surface;
 e. a second bushing positioned over a portion of said exterior of said bolt adjacent said second end of said bolt, said first bushing comprising:
  i. an exterior surface;
  ii. an interior surface formed with a plurality of lubricant guide grooves, wherein at least two of said plurality of lubricant guide grooves intersect at an exit hole, wherein said exit hole extends from said exterior surface to said interior surface.

2. The suspension bearing lubrication system according to claim 1 wherein said exit hole of said first bushing is further defined as being aligned with said first hole in said bolt.

3. The suspension bearing lubrication system according to claim 1 wherein said exit hole of said second bushing is further defined as being aligned with said second hole in said bolt.

4. The suspension bearing lubrication system according to claim 1 wherein said exit hole of said first bushing is further defined as being misaligned with said first hole in said bolt.

5. The suspension bearing lubrication system according to claim 1 wherein said exit hole of said second bushing is further defined as being misaligned with said second hole in said bolt.

6. The suspension bearing lubrication system according to claim 1 wherein said bolt further comprises a third hole extending from an exterior of said bolt to said first longitudinal passageway, wherein said third hole is oriented in a radial dimension with respect to said bolt, and wherein said third hole is axially spaced from said first hole.

7. The suspension bearing lubrication system according to claim 6 wherein said bolt further comprises a fourth hole extending from an exterior of said bolt to said second longitudinal passageway, wherein said fourth hole is oriented in a radial dimension with respect to said bolt, and wherein said third hole is axially spaced from said second hole.

8. The suspension bearing lubrication system according to claim 7 wherein said first bushing further comprises a second exit hole at an intersection of said plurality of lubricant grooves.

9. The suspension bearing lubrication system according to claim 8 wherein said second bushing further comprises a second exit hole at a second intersection of said plurality of lubricant grooves.

10. The suspension bearing lubrication system according to claim 9 wherein said bolt further comprises a fifth hole extending from an exterior of said bolt to said first longitudinal passageway, wherein said fifth hole is oriented in a radial dimension with respect to said bolt, and wherein said fifth hole is radially spaced from said first hole by 180 degrees.

11. The suspension bearing lubrication system according to claim 10 wherein said bolt further comprises a sixth hole extending from an exterior of said bolt to said second longitudinal passageway, wherein said sixth hole is oriented in a radial dimension with respect to said bolt, and wherein said sixth hole is radially spaced from said second hole by 180 degrees.

* * * * *